(12) United States Patent
Kingery et al.

(10) Patent No.: US 10,072,731 B2
(45) Date of Patent: Sep. 11, 2018

(54) TIE DOWN MECHANISM

(71) Applicants: Kenneth G. Kingery, Mesa, AZ (US); Kenneth J. Ross, Wixom, MI (US)

(72) Inventors: Kenneth G. Kingery, Mesa, AZ (US); Kenneth J. Ross, Wixom, MI (US)

( * ) Notice: Subject to any disclaimer, the term of this patent is extended or adjusted under 35 U.S.C. 154(b) by 0 days.

(21) Appl. No.: 15/069,349

(22) Filed: Mar. 14, 2016

(65) Prior Publication Data

US 2016/0265623 A1    Sep. 15, 2016

Related U.S. Application Data

(60) Provisional application No. 62/132,664, filed on Mar. 13, 2015.

(51) Int. Cl.
| | | |
|---|---|---|
| *F16G 11/12* | (2006.01) | |
| *E04H 15/32* | (2006.01) | |
| *E04H 15/64* | (2006.01) | |
| *F16G 11/10* | (2006.01) | |

(52) U.S. Cl.
CPC ............ *F16G 11/12* (2013.01); *F16G 11/101* (2013.01); *Y10T 24/3969* (2015.01)

(58) Field of Classification Search
CPC .... F16G 11/12; F16G 11/101; Y10T 24/3469; Y10T 24/3936; Y10T 24/3942; Y10T 24/394
See application file for complete search history.

(56) References Cited

U.S. PATENT DOCUMENTS

| | | | | |
|---|---|---|---|---|
| 2,053,018 A | * | 9/1936 | Bell | F16G 11/101 24/133 |
| 5,531,297 A | * | 7/1996 | Pipan | B66D 5/16 188/65.1 |
| 5,823,020 A | * | 10/1998 | Benda | E05B 67/003 24/132 R |
| 7,293,438 B2 | * | 11/2007 | Benda | F16G 11/106 24/132 WL |
| 8,142,434 B2 | * | 3/2012 | Bluechel | A61B 17/8061 606/280 |
| 2011/0056050 A1 | * | 3/2011 | Hassing | F16G 11/106 24/132 R |

* cited by examiner

*Primary Examiner* — Robert John Sandy
(74) *Attorney, Agent, or Firm* — Bycer Law, PLC; Matthew L. Bycer

(57) ABSTRACT

A tie down apparatus for pinching a rope within a hollow channel via single-hand manipulation of an ergonomic tie down handle. A plunger lock contains a pinching surface which is drawn into the hollow channel via cam-action rotating handle. The plunger lock contains a threaded surface to allow variable sized rope access, so as to work with a number of different ropes and webbings. An optional lock or set of locks serve to secure tie down in locked position.

21 Claims, 19 Drawing Sheets

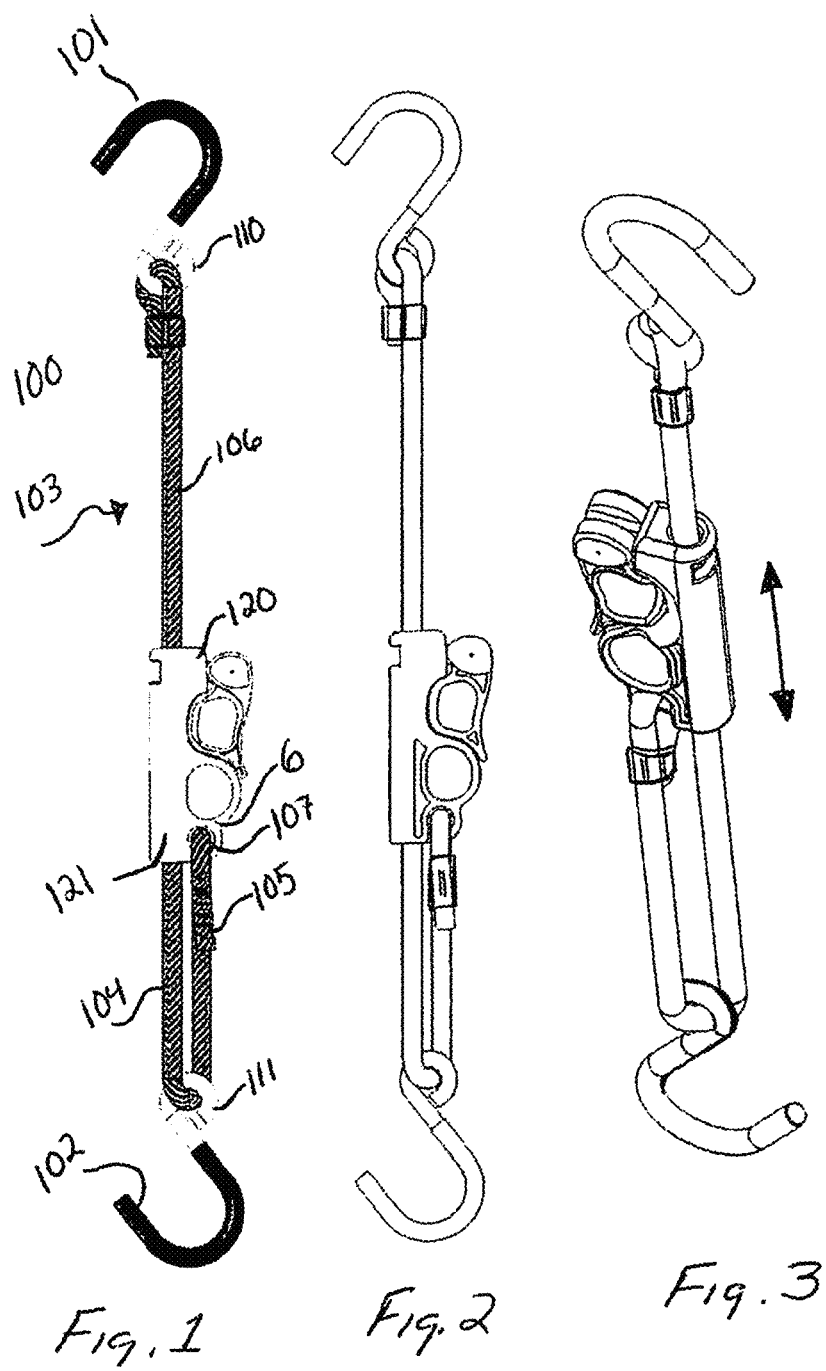

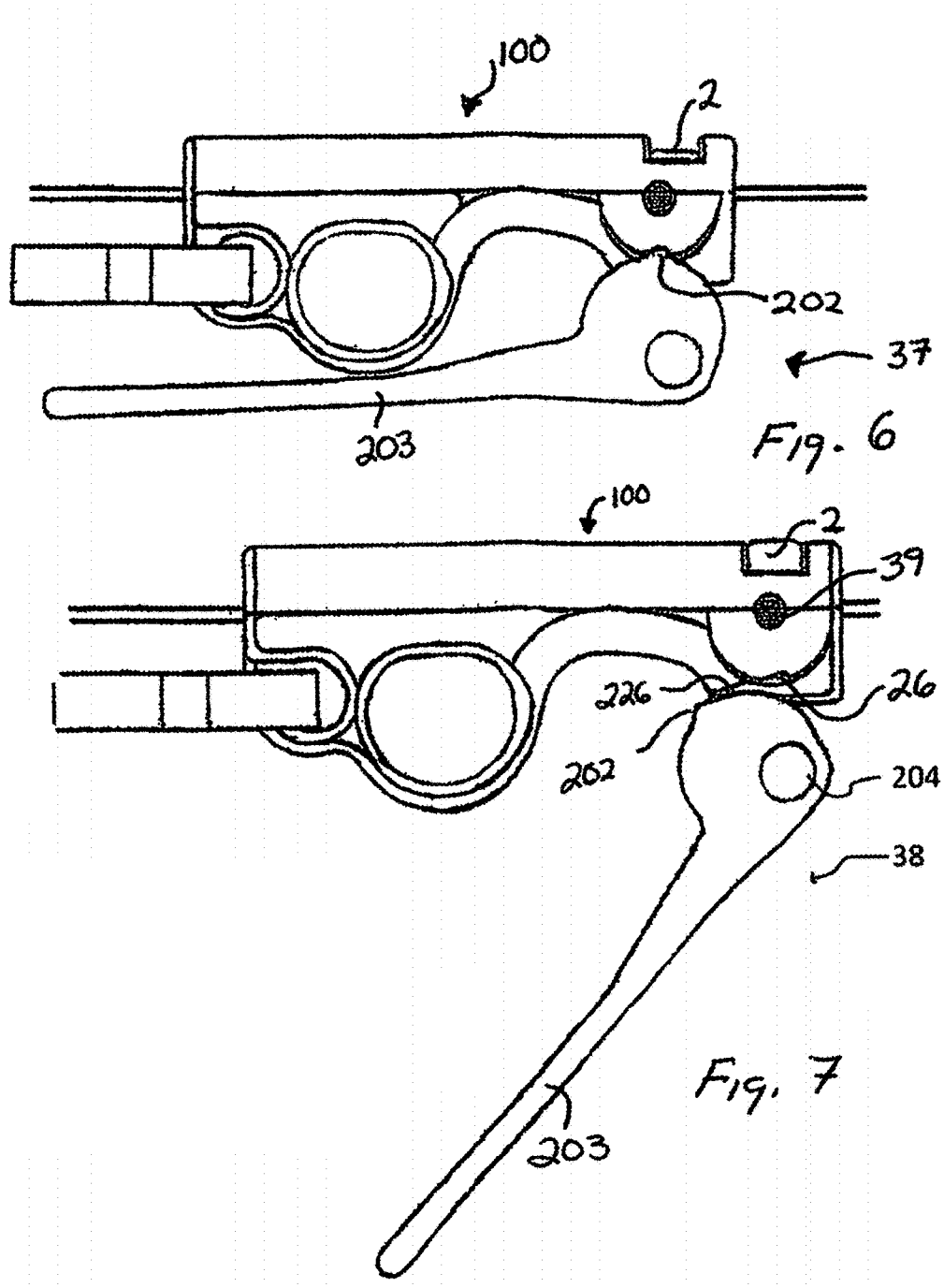

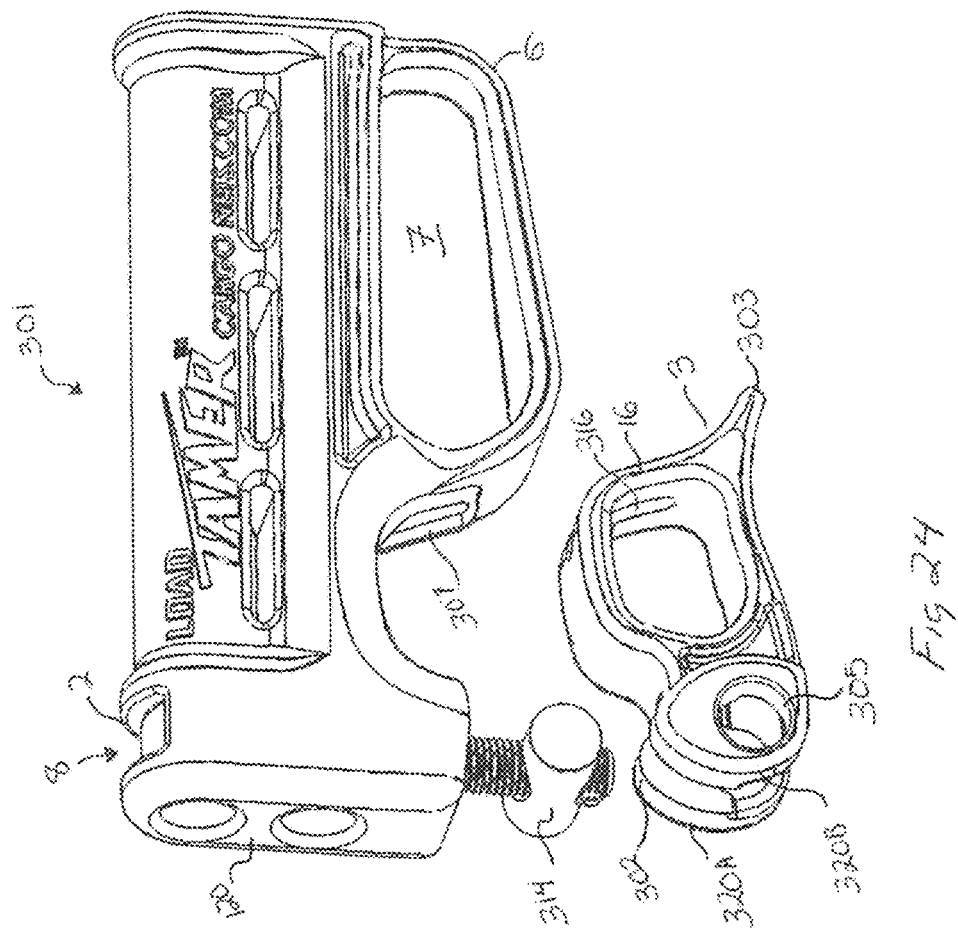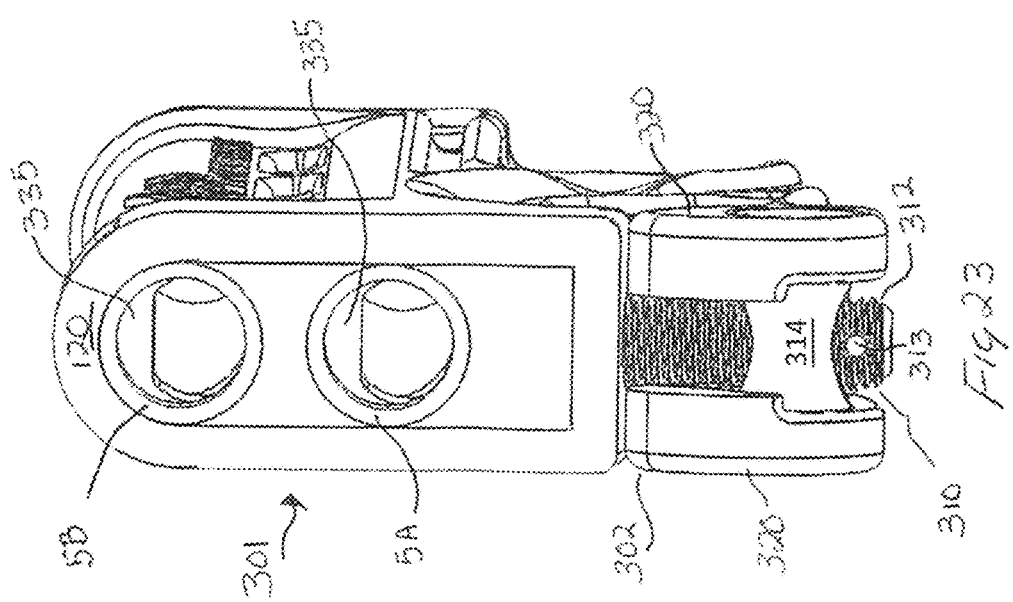

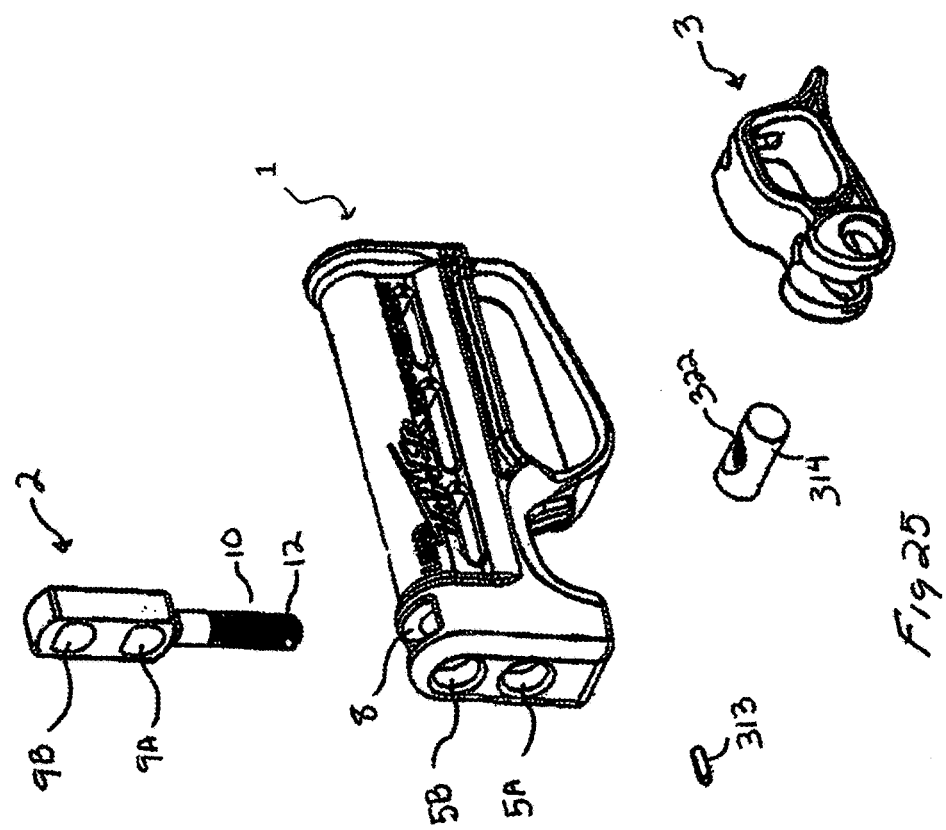

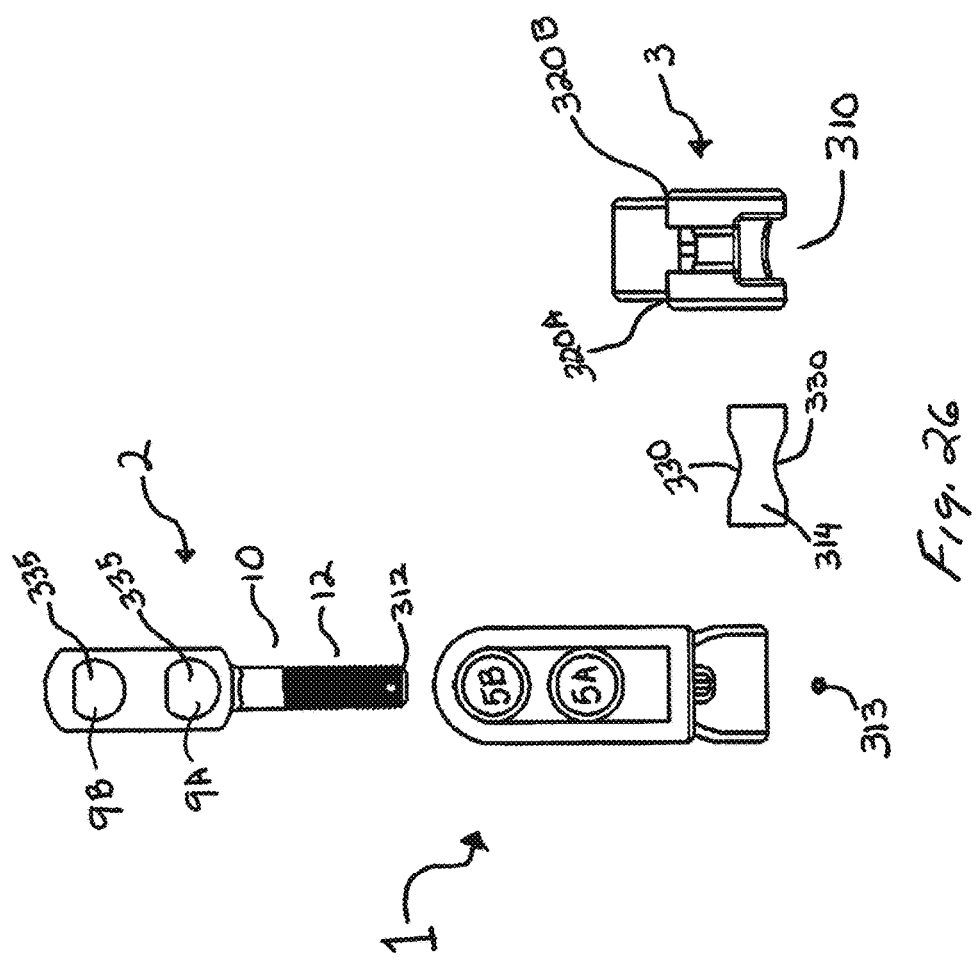

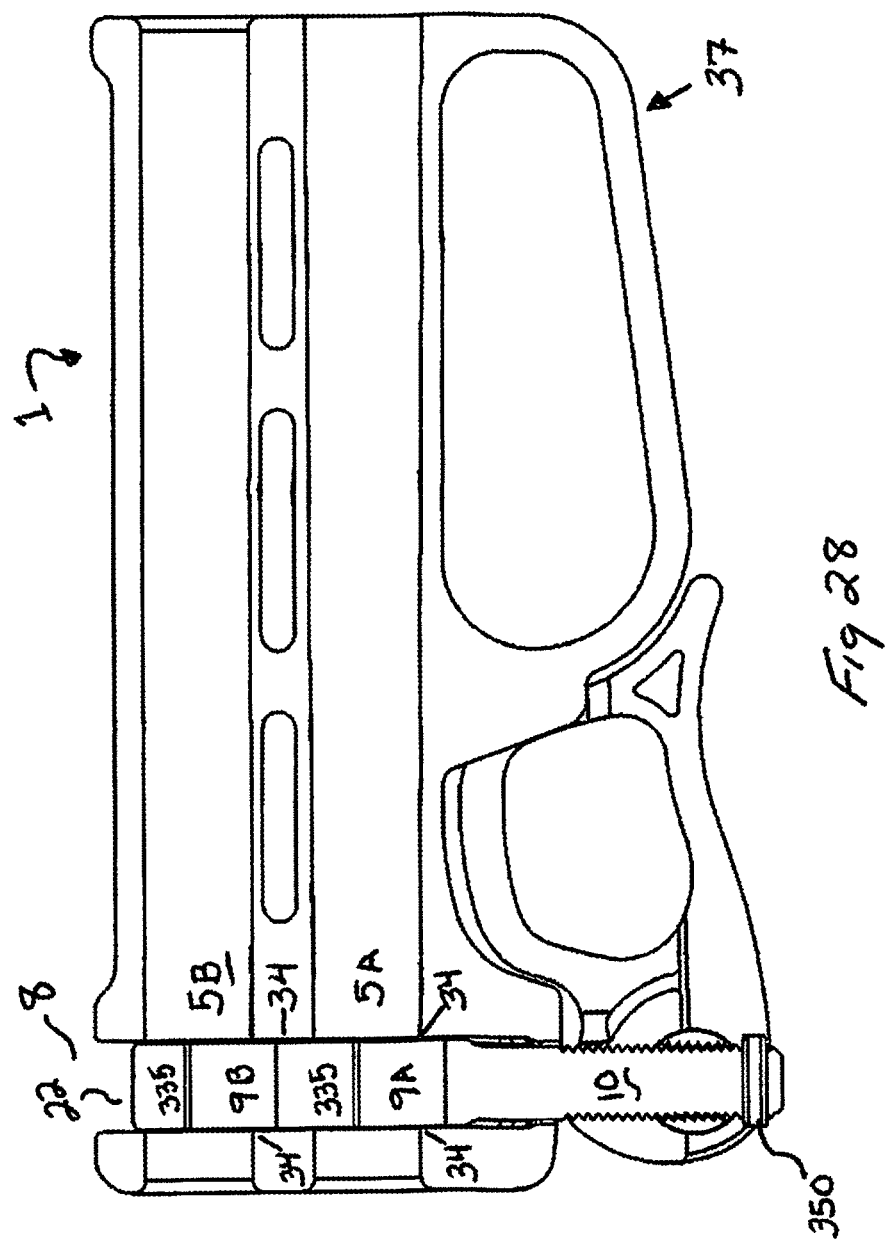

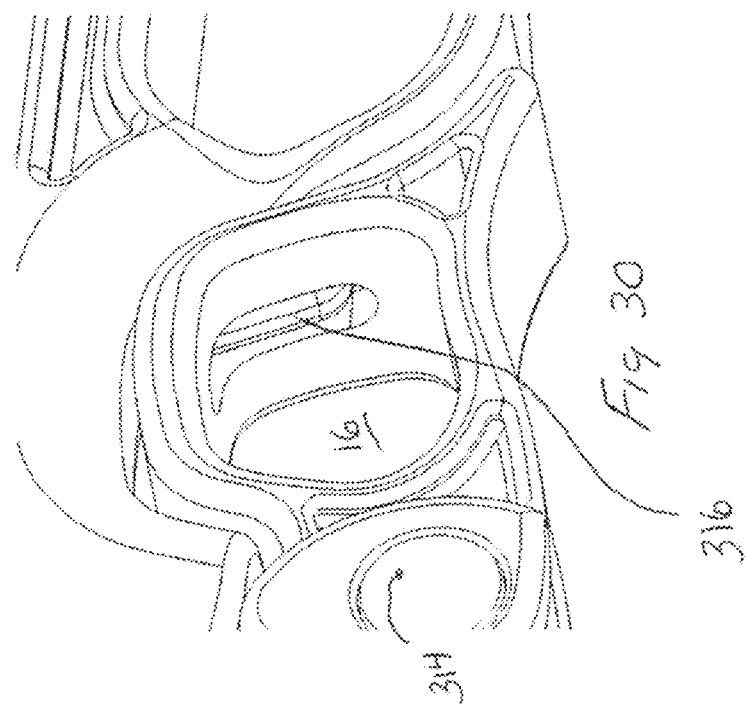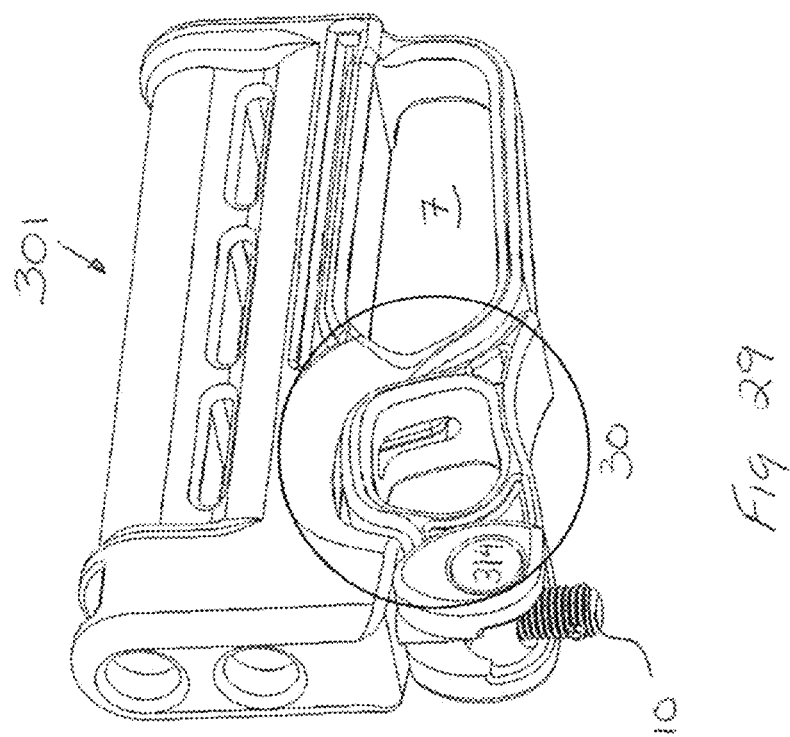

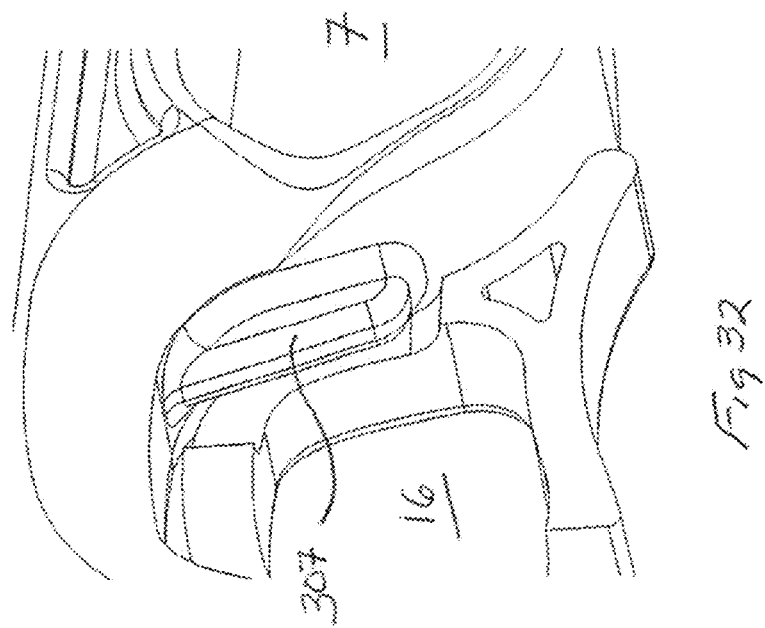
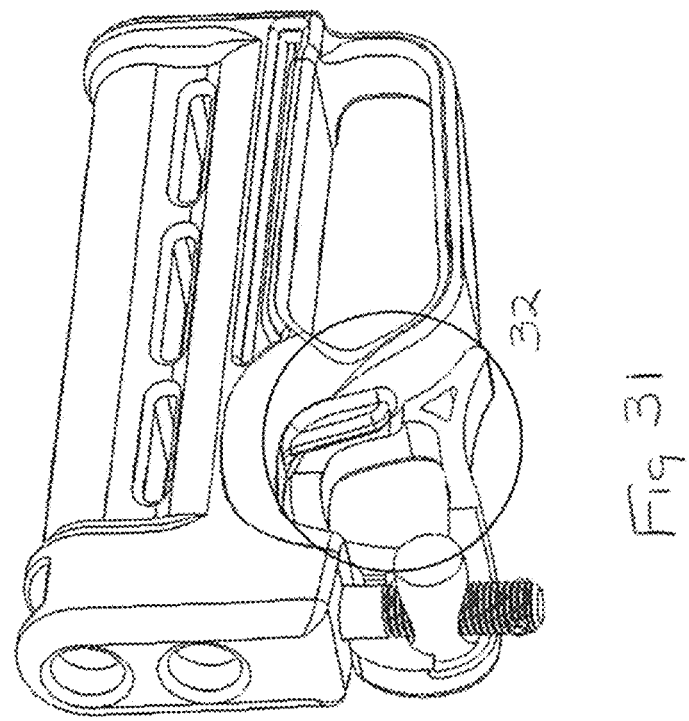

TIE DOWN MECHANISM

CLAIM OF PRIORITY

The present application includes subject matter disclosed in and claims priority to a provisional application entitled "Tie Down Mechanism" filed Mar. 13, 2015 and assigned Ser. No. 62/132,664 describing an invention made by the present inventor.

FIELD OF THE INVENTION

The present invention relates to tie-down mechanisms in general. More specifically, the present invention deals with single-hand operable loop tie downs.

SUMMARY OF THE INVENTION

The Shelter Tie-Down unit was designed to replace the dog bone for a rapid deployment equipment and mobile tactical shelters used by the U.S. Military and FEMA to enhance mobilization. It is preferably made of a glass-filled nylon and is shaped to fit in the grooves of your hand making it a true hand grip tie-down.

The Shelter Tie-Down may be used as a single barrel or double barrel to suit any need and can even be modified to become a traditional tie-down with over 1,000 lbs of holding capacity.

The tie-down mechanism utilizes a wedge lock design on a line of rope, webbing, or the like to make the line adjustable length and tie down objects for securement in an ergonomic shape contoured to the user's hand and improve ease of use.

The tie down mechanism can be constructed of molded plastics, aluminum, steel, stainless steel, carbon fiber, or any other materials robust enough to withstand high weight limits and extreme pressure. The tie down consists of four parts: a housing body, a plunger/lock, a handle, and a barrel nut or pin to secure the parts together.

The housing body contains two holes: one to, attach the rope, webbing, or the like [body anchor point], and one as a body finger hold to grip the mechanism. Above the two holes is one or more horizontal shafts [body barrel] running the length of the body for rope, webbing or the like to be inserted in one end and exit out the other side. Near the opposite edge of the two holes is a vertical shaft [body plunger shaft] for the plunger to be inserted. An optional lock can be included which locks the plunger/lock in place, preventing movement until released. The plunger/lock can be comprised of the same material as the body housing and contains one hole for each shaft in the body housing. Below the hole(s) is a plunger long arm for connection to the handle. The plunger can be smooth or threaded for adjustment to the diameter of the horizontal shaft.

The handle can be comprised of the same material as the body housing and/or the plunger and contains a hole to grip the mechanism and a smaller hole for pin or barrel nut to attach the handle to the plunger, and act as an axis of rotation. On one end of the handle are two protrusions that surround the plunger, each with a small hole that align with a small hole in the plunger. A barrel nut or pin is inserted through both sides of the handle and plunger to connect the two parts. The handle can be any length, short with only a finger hole, longer for additional leverage in tensioning, or adjustable length and is shaped to fit the contours of the hand holding it. The pin or barrel nut can be comprised of steel, stainless steel, or any material robust enough to withstand the forces placed upon it. A pin is used for non-adjustable diameter of the housing body shaft(s) and a threaded barrel nut and threaded plunger would be used for adjustable diameter of the housing body shaft(s) to accommodate different sizes of rope, webbing, or the like. The pin or barrel nut are inserted through one side of the handle, through the plunger, and terminating at the other side of the handle and is a permanent or semi-permanent attachment. Rope, webbing, or the like is attached to the body anchor point and is inserted through the body barrel and terminating through the other end. The terminal point of the rope, webbing, or the like can be attached to a hook which can be connected to an anchor point or object to be secured. One or more floating or attached hooks can be on the opposite end of the rope between the body anchor point and the body barrel. These hooks can be connected to an anchor point or any object to be secured.

When handle is in vertical open position, the plunger hole(s) align with the body barrel shaft to allow for free movement of rope, webbing or the like within the mechanism. When handle is rotated counter clockwise into the lock position, the plunger is pulled downward and the plunger hole no longer aligns with the body barrel. This creates pressure on the rope, webbing, or the like, wedging it into the plunger shaft in the body barrel housing, thus preventing rope, webbing, or the like from movement.

BRIEF DESCRIPTION OF THE DRAWINGS

FIG. 1 demonstrates an embodiment of the tie down of the present invention.

FIG. 2 demonstrates an embodiment of the tie down of the present invention.

FIG. 3 demonstrates an embodiment of the tie down of the present invention.

FIG. 6 demonstrates a side-view cross-section of an embodiment of the tie down of the present invention.

FIG. 7 demonstrates a side-view cross-section of an embodiment of the tie down of the present invention.

FIG. 23 demonstrates a front perspective view of an embodiment of the present invention.

FIG. 24 demonstrates a partially exploded side view perspective view of an embodiment of the present invention.

FIG. 25 demonstrates an exploded perspective view of an embodiment of the present invention.

FIG. 26 demonstrates a frontal exploded view of an embodiment of the present invention.

FIG. 28 demonstrates a side view cross section of an embodiment of the present invention.

FIG. 29 demonstrates a lower perspective view of an embodiment of the present invention.

FIG. 30 demonstrate a close-up view of the portion of FIG. 29 in circle 30.

FIG. 31 demonstrates a partially exploded cross-sectional lower perspective view of an embodiment of the present invention.

FIG. 32 demonstrate a close-up view of the portion of FIG. 31 in circle 32.

DETAILED DESCRIPTION

Figure 4:
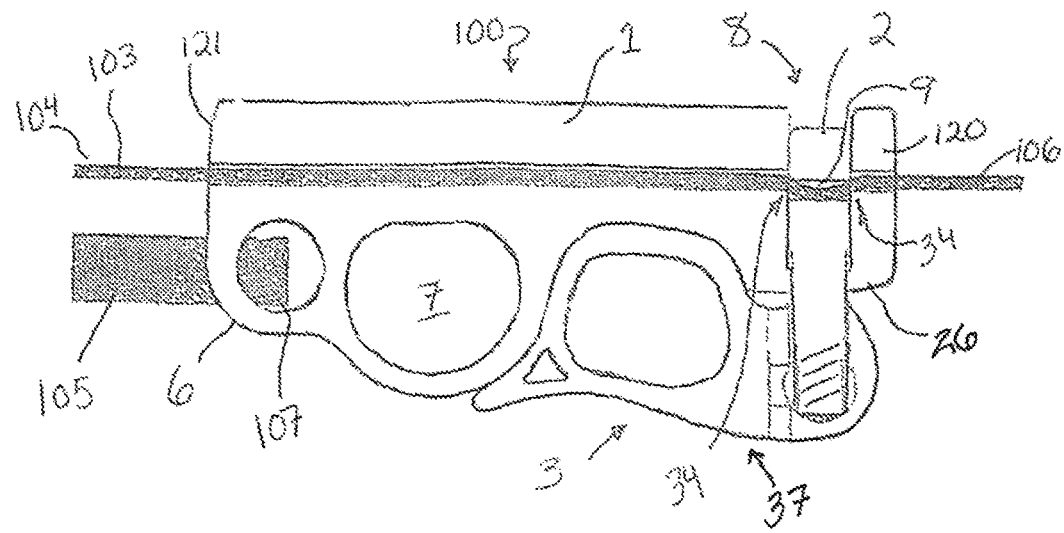
FIG. 4 demonstrates a side-view cross-section of an embodiment of the tie down of the present invention.

The present invention includes a novel means for activating a tie-down of a length of rope by securing the tie down to a rope at a set position along a rope. By securing one end to the tie-down, the tie-down can effectively set the size of a loop and/or the effective length of the rope. As disclosed herein and otherwise claimed, the term rope used herein refers to any length of at least partially flexible material such that the pinching mechanism of the present invention can be utilized. Therefore, the term rope generally refers to a rope, string, segment, cord, webbing, etc. of a variety of materials including cotton, nylon, metal, plastic, as are known in the art.

As shown in FIGS. 1-3 a tie-down 100 embodiment of the present invention may be used with first hook 101 attached to a rope 103 at first rope end 110, typically towards top face 121 of the tie down. Single length 106 of rope provides for a primary lengthening section of the rope. Rope 103 translates through tie down 100 and emerges from back end 121. Alternatively, first end of rope is secured to anchor and run through back end to emerge from front end. A first segment 104 emerges from tie down 100 and loops around a hook end 111 that allows rope 103 to slip by hook end to modulate the lengths of first segment 104 and second segment 105, and thereby modify the position and potential distance between first hook 101 and second hook 102. Second rope segment 105 includes rope that may be tied or fixed at body anchor point 6 on tie down 100 via second rope end 107.

Figure 5:
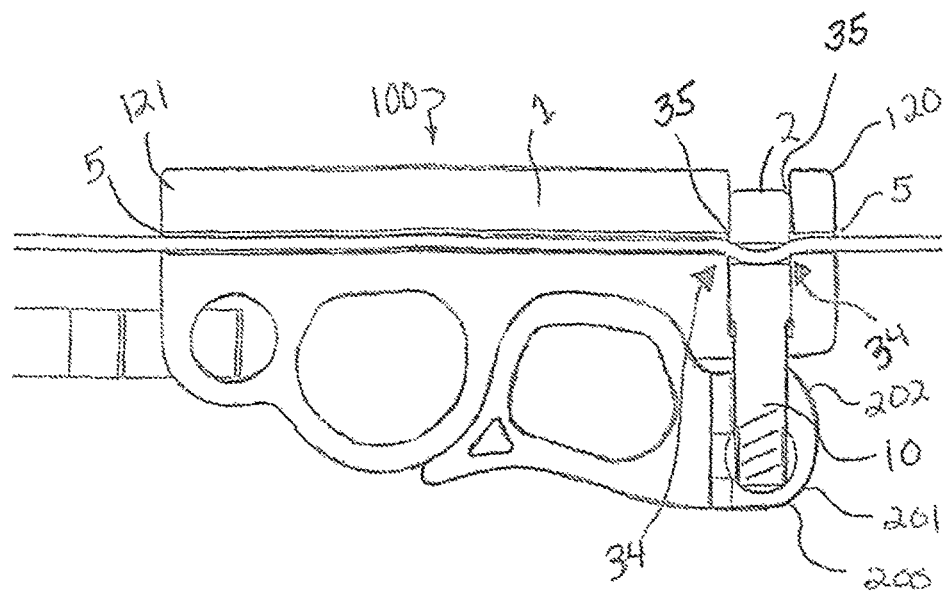
FIG. 5 demonstrates a side-view cross-section of an embodiment of the tie down of the present invention.
Figure 8:
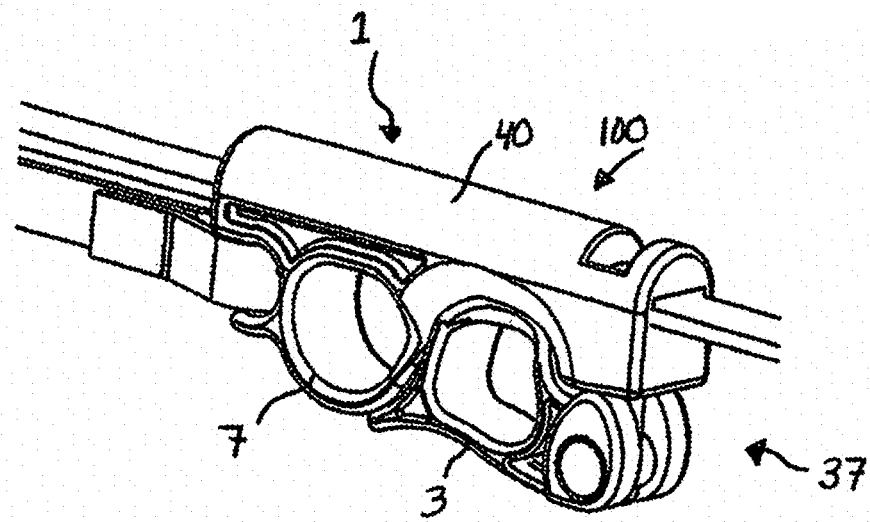
FIG. 8 demonstrates a frontal perspective view of an embodiment of the tie down of the present invention.
Figure 9:
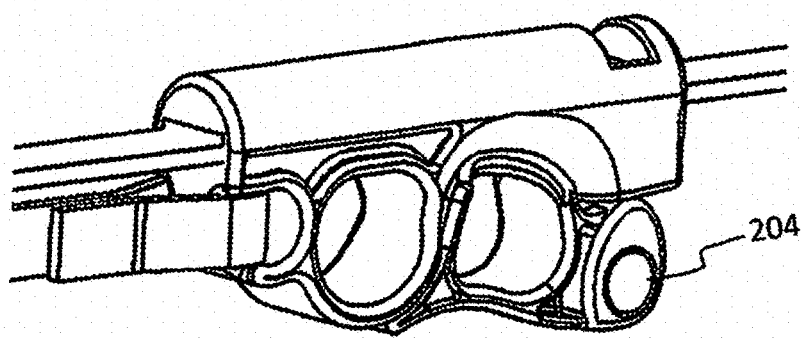
FIG. 9 demonstrates a rear perspective view of an embodiment of the tie down of the present invention.
Figure 10:
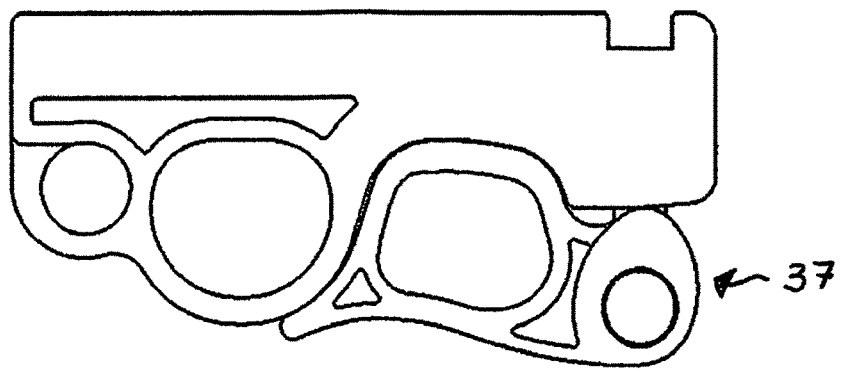
FIG. 10 demonstrates a side-view cross-section of an embodiment of the tie down of the present invention.
Figure 11:
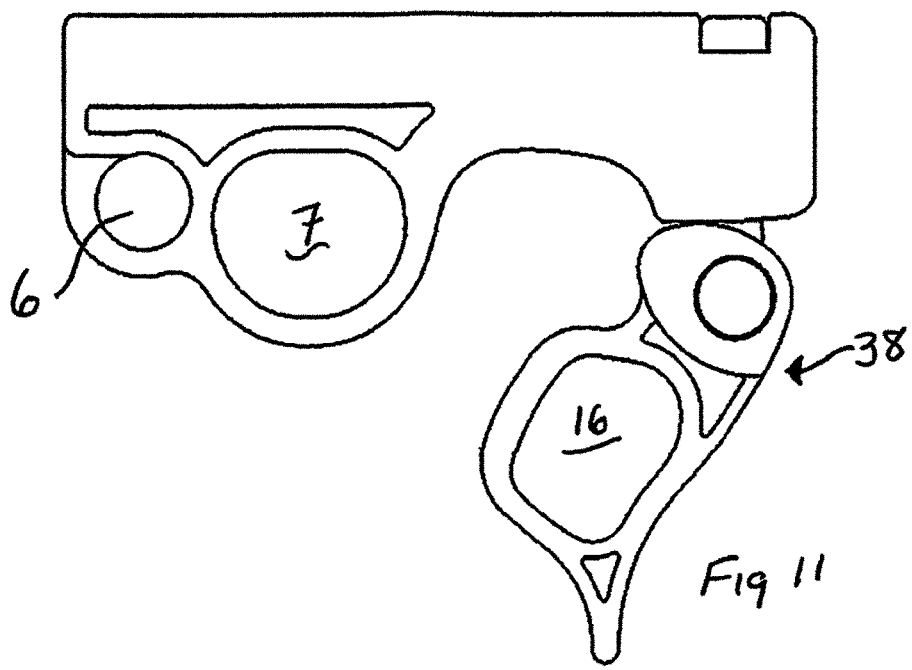
FIG. 11 demonstrates a side-view cross-section of an embodiment of the tie down of the present invention.

As shown in FIGS. 4-5, tie down 100 is in locked position with handle 3 closed tightly against body 1. Rope 103 may be a thin webbing. First segment 104 exits back end 121 and loops back around to second segment 105. Second rope end 107 attached to tie down at anchor point 6. In this embodiment, anchor point is a separate cross-hole allowing for attachment of the rope end 107. Handle 3 is in closed or lock position 37 up against body 1. Handle includes cam end 200 with cam point 202 engaged with camming surface 26 and cam round or flat 201 facing forward.

Body 1 includes barrel 5 which functions as a hollow channel longitudinally passing through body from back end 121 to front end 120. Plunger lock 2 fits in shaft 8. Shaft 8 intersects barrel 5 to allow plunger lock 2 to fit therein. Plunger lock 2 includes hole 9 to allow for rope 103 to pass through hole 9 within barrel 5, when tie down is open. However, as shown here, in locked position 37, hole 9 is slightly offset from barrel 5 and thus restricts the freedom of rope 103 to pass through or otherwise traverse barrel. When locked 37, cam point 202 is pressed against body camming surface 26 to pull plunger lock 2 downwards and pinch rope between lock sides 35 and housing sides 34. Plunger sides 35 and housing sides 34 may be reinforced, or textured/toothed to promote strong locking of rope.

As an alternative use of the same embodiment, the tie down can be converted into a simple hand-to-hand combat weapon. A single, piece of material, such as a nail or blade, can be inserted into barrel 5 through face 120, and then plunger lock can bite down to hold in place. The single piece can include complimentary features to better mate and fix on plunger lock when tie down is closed.

As shown in FIGS. 6-7, an alternative embodiment of tie down 100 includes long handle 203 to provide additional torque from pivot point 204 at the bottom of plunger lock 2 (bottom not shown), so that when pulled into closed position as shown in FIG. 6, cam point 202 meets with camming surface 26 and thereby pulls plunger lock down. Long handle 203 is preferred for smaller rope diameters and webbing, as it allows ease of application of additional pressure to rope within plunger lock and barrel. Larger handle may also be used for stiff rope application, e.g. threaded steel cord, or significantly slippery rope that requires tight tie down, e.g. nylon webbing. When in open position 38, cam point 202 moves from camming surface 26, potentially through camming surface channel 226, and allows plunger lock 2 to rise and return to open position 38, whereby (not shown) plunger hole better aligns with barrel. Tie down includes optional lock 39 on the side of the tie down to force engagement with the plunger lock in a closed (and possible second open) position. In this embodiment, lock 39 includes a pin or bolt that can be pushed into engagement with plunger lock surface (not shown) to engage and fix the position of plunger lock down so that the rope is fixed. Lock may include a spring loaded pin that will snap into place, pushing into the shaft to engage the plunger lock surface, or a feature on the plunger lock outer surface. A spring loaded lock may require a disengagement, e.g. via push button on the outer surface of the tie down body, to release engagement with the plunger lock and allow the tie down to open.

As shown in FIGS. 8-11, tie down 100 is in locked position 37, and may include finger hole 7 and handle 3. Body 1 functions as a single hand tool whereby palm can be pressed against top 40 and middle finger can fit in finger hole 7 fixed near anchor point 6, while the pointer finger can be used in handle 3 handle finger hole 16 to effect closure. Using the torque around pivot point 204, the handle acts as a lever, tie down 100 can be locked with less than 10 lbs of pressure to achieve hundreds of pounds of translated force against translation of the rope through the barrel.

Figure 12:
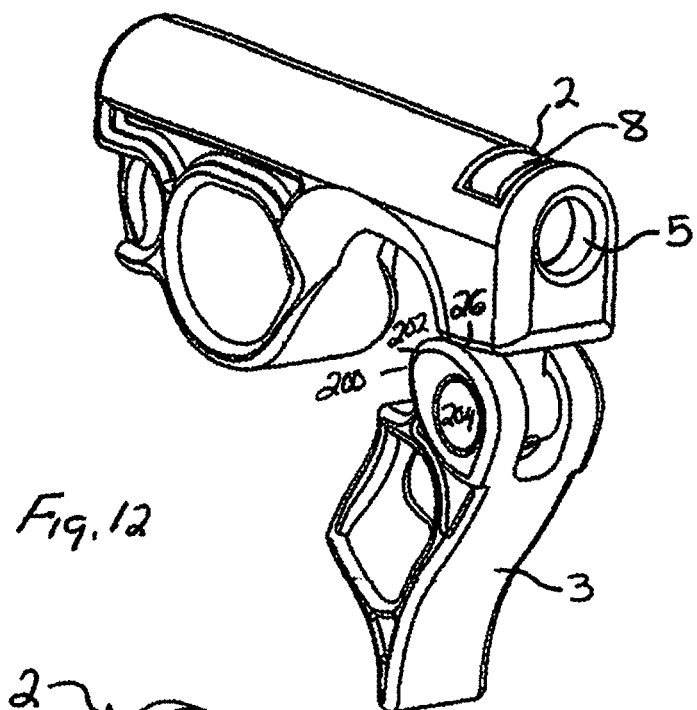
FIG. 12 demonstrates a frontal perspective view of an embodiment of the tie down of the present invention.
Figure 13:
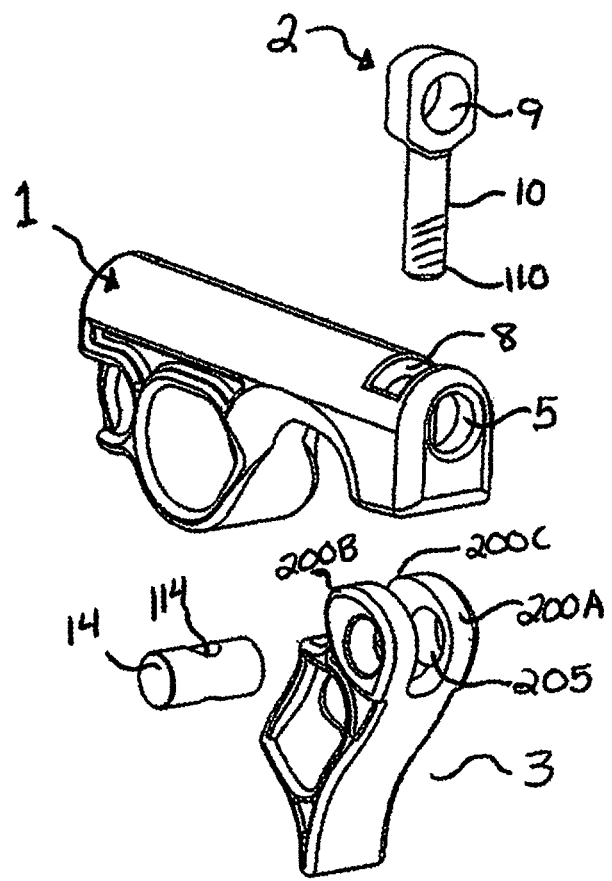
FIG. 13 demonstrates an exploded frontal perspective view of the tie down of the present invention.

As shown in FIGS. 12-13, an embodiment of tie down 100 includes body 1 with barrel 5 and plunger lock 2. Handle 3 rotates around pivot point 204, which in this instance is held by a cylindrical barrel nut 14. Plunger lock 2 includes plunger hole 9 and pull arm 10, and extends into shaft 8 in body 1. The arm end 110 mates with barrel nut 14. Handle 3 includes cam 200 which may comprise right and left cams 200A and 200B with a space therebetween 200C to provide for the passage of arm 10 as handle 3 rotates around barrel nut 14. Barrel nut fits in handle barrel nut channel 205. Barrel nut includes interior hole 114 to accommodate arm 10 end 110. In one preferred embodiment arm 10 includes a threaded surface to mate with the interior surface of a barrel interior hole. Handle rotates around pivot point 204 and forces cam point 202 against camming surface 26 to pull down plunger lock, and thereby misalign plunger hole 9 from barrel 5.

Figure 14:
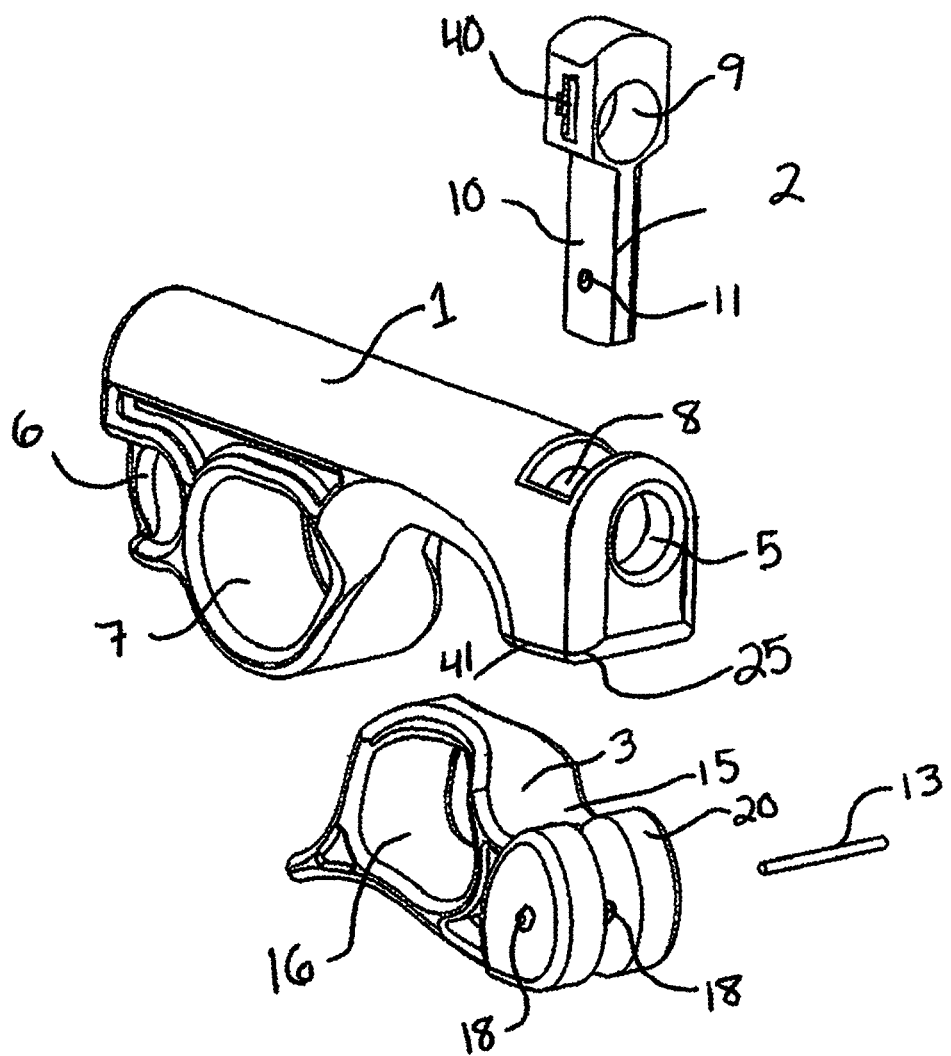
FIG. 14 demonstrates an exploded frontal perspective view of the tie down of the present invention.

As shown in an alternative embodiment shown in FIG. 14, body 1 includes anchor point 6, finger hole 7, shaft 8, and barrel 5. Below and surrounding the shaft where it opens at bottom side 41 is camming surface bottom 25. Handle 3 includes handle finger hole 16, and potentially includes pin 13 to fit within bifurcated cam 20 through pin holes 18, whereby pin acts as torque rotation axis. Plunger lock 2 includes plunger hole 9, which when open should align with barrel 5. Plunger arm 10 extends below plunger hole 9 and includes plunger pin hole 11 which serves to mount plunger lock 2 through body 1 and on handle 3 via single pin 13. Optional lock feature 40 is included on arm 10 to allow for locking of plunger lock in relative position with body. Lock may include a rotatable key lock to push a bolt into plunge lock surface and thereby secure tie down in locked position. Plunger lock arm 10 can take a variety of shapes, such as a square, rectangular, or half-moon shape to mate with a retention member, such as pin 13 to secure tie down together. When a specific material and/or diameter of rope is requested, as fixed size plunger can be adequately permanently installed, leading to simpler single-size function item, rather than an adjustable version with lever threads, etc.

Figure 15:
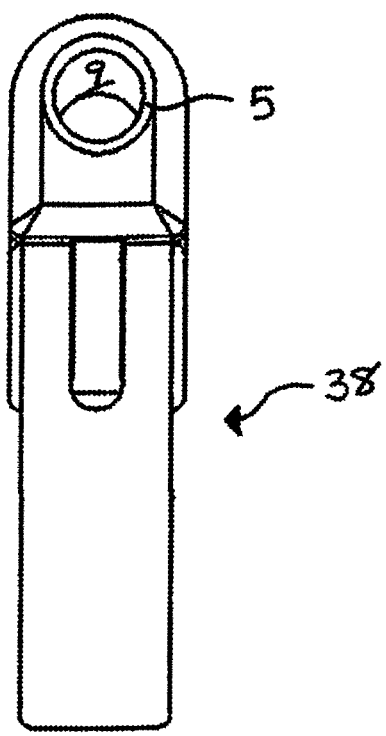
FIG. 15 demonstrates a front view of an embodiment of the tie down of the present invention.
Figure 16:
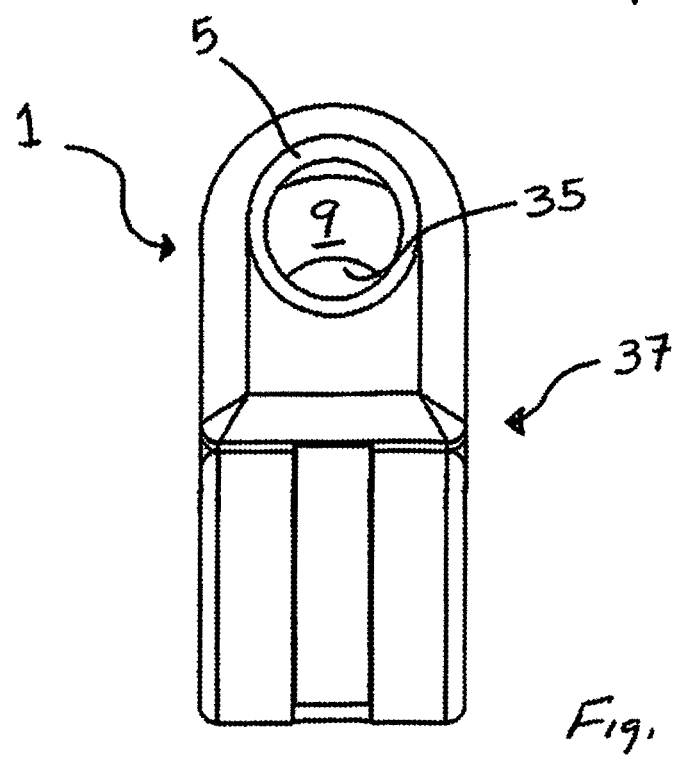
FIG. 16 demonstrates a front view of an embodiment of the tie down of the present invention.

As shown in FIGS. 15-16, tie down body 1 can be in open position 38 whereby barrel 5 aligns with plunger hole 9. When in closed position 37, plunger lock is pulled downwards, misaligning with barrel, and partially occludes barrel 5 by insertion of plunger lock side 35 into barrel 5 and pinches a rope (not shown).

Figure 17:
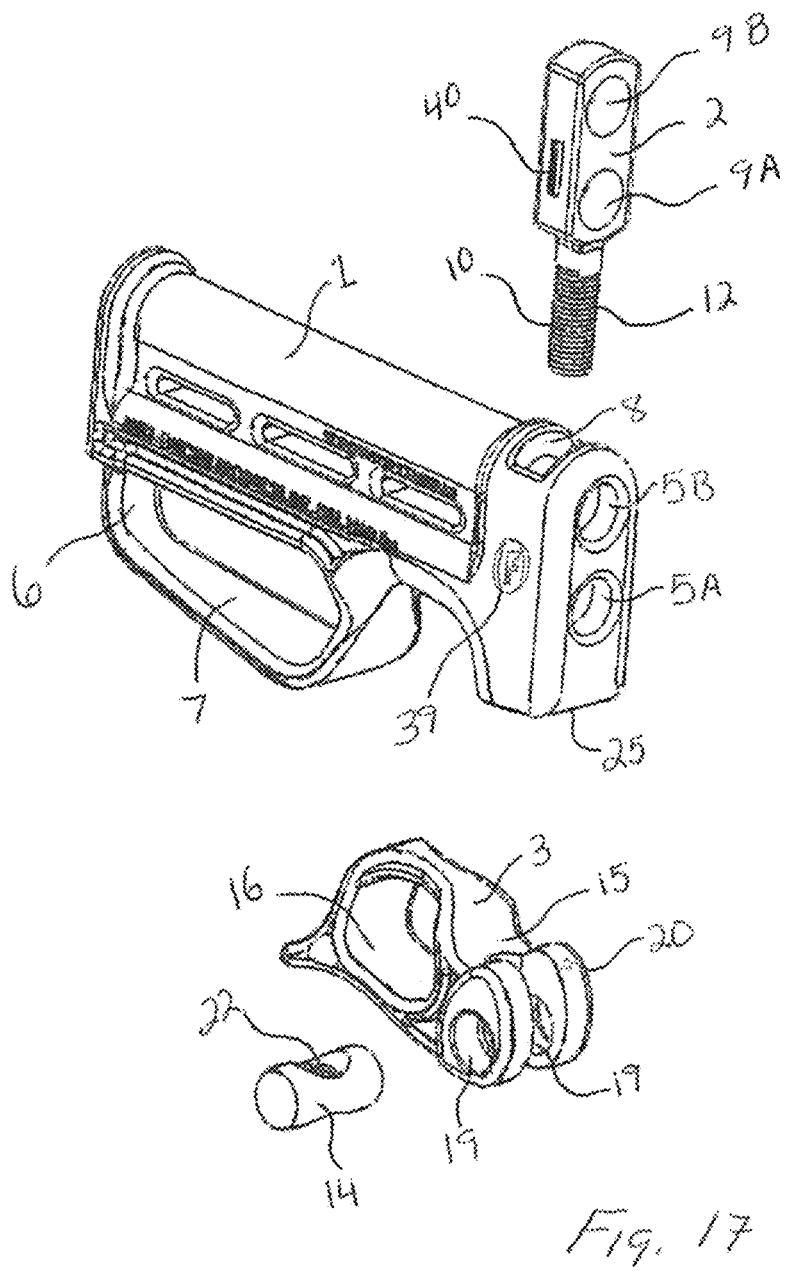
FIG. 17 demonstrates a front view of an embodiment of the tie down of the present invention.
Figure 18:
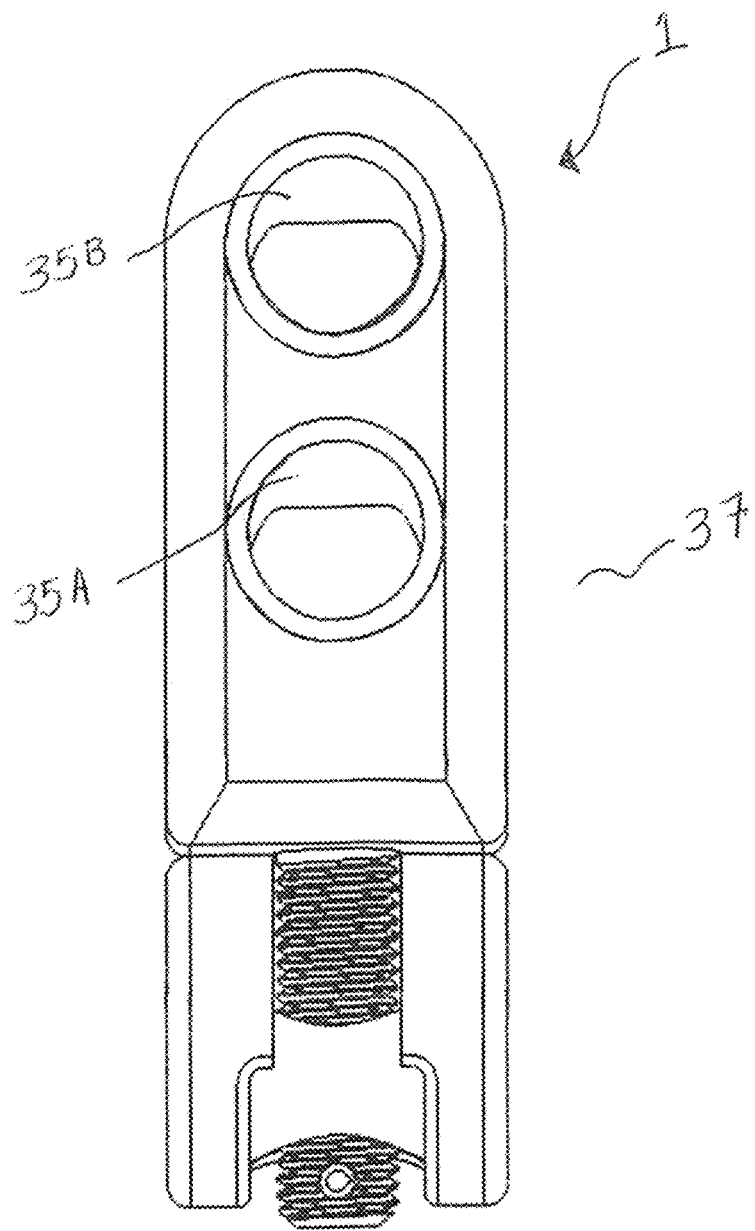
FIG. 18 demonstrates an exploded frontal perspective view of an embodiment of the tie down of the present invention.
Figure 19:
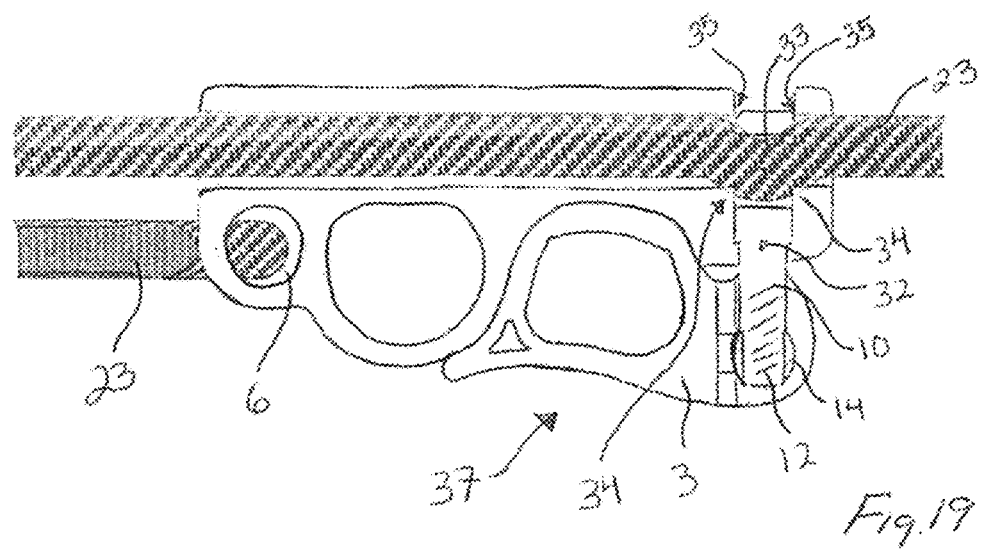
FIG. 19 demonstrates a side-view cross-section of an embodiment of the tie down of the present invention.
Figure 20:
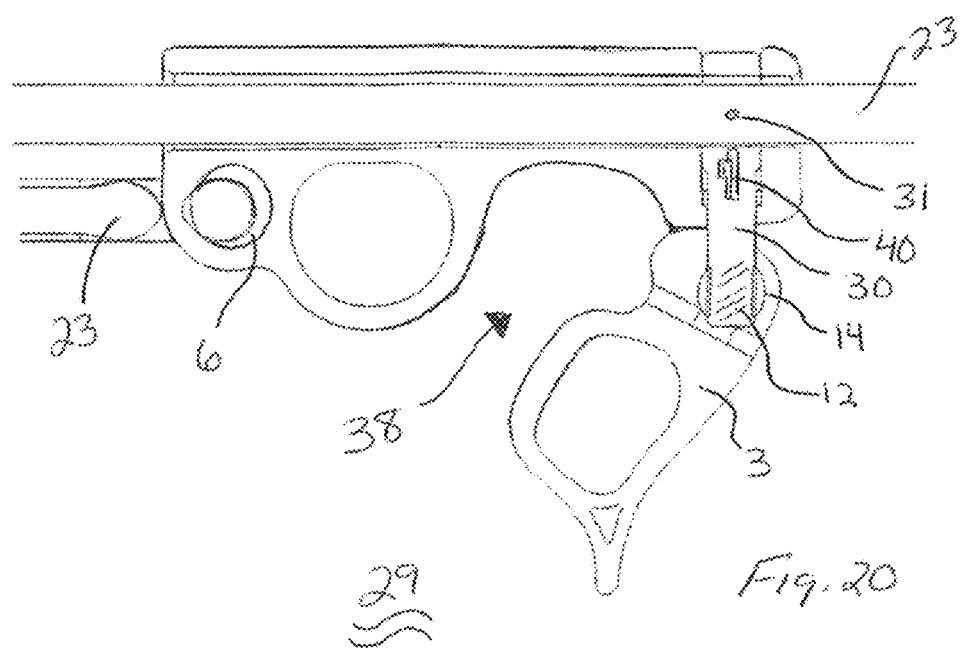
FIG. 20 demonstrates a side-view cross-section of an embodiment of the tie down of the present invention.
Figure 21:
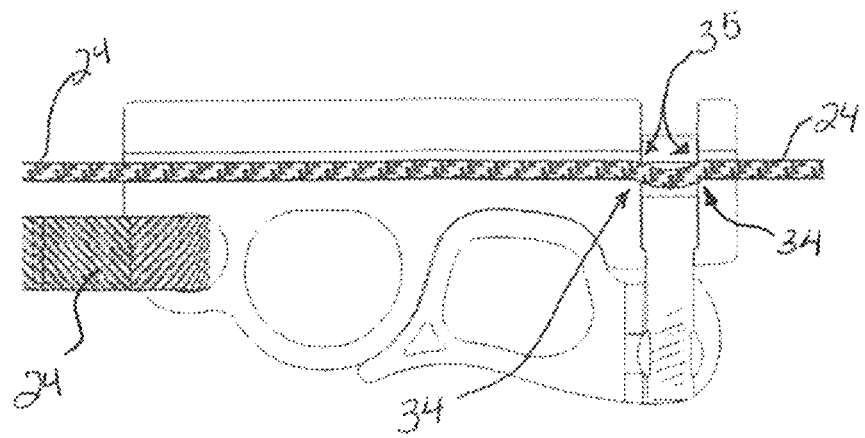
FIG. 21 demonstrates a side-view cross-section of an embodiment of the tie down of the present invention.
Figure 22:
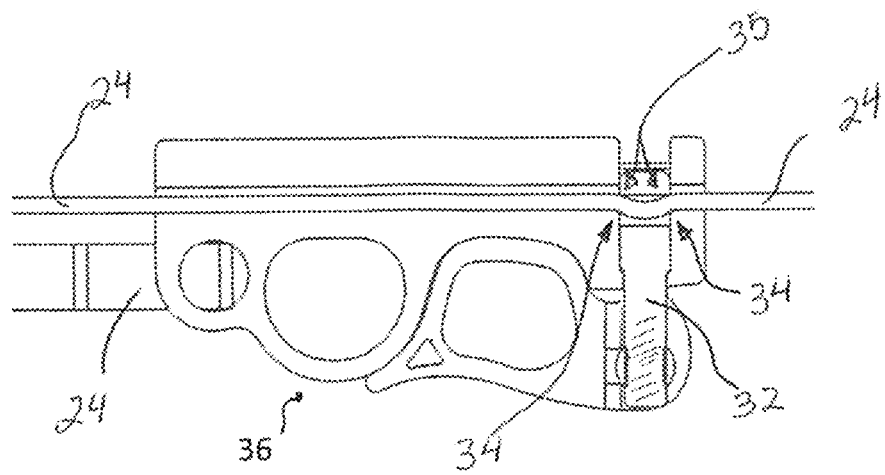
FIG. 22 demonstrates a side-view cross-section of an embodiment of the tie down of the present invention.
Figure 27B:
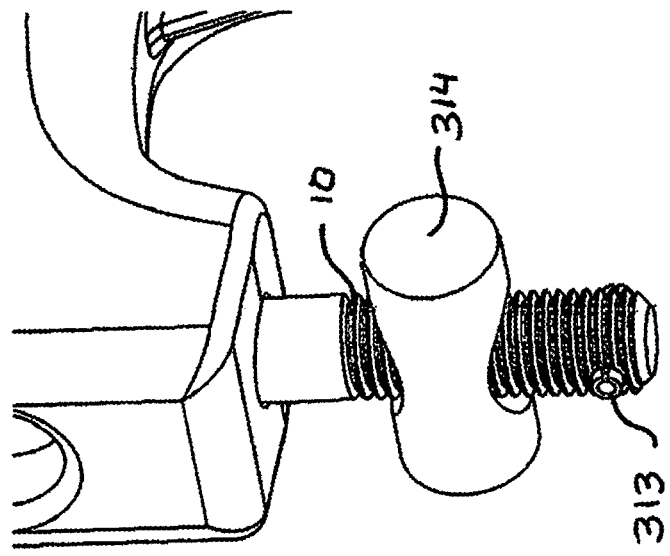
FIG. 27B demonstrates a close-up view of the portion of FIG. 25 in circle 29.
Figure 27A:
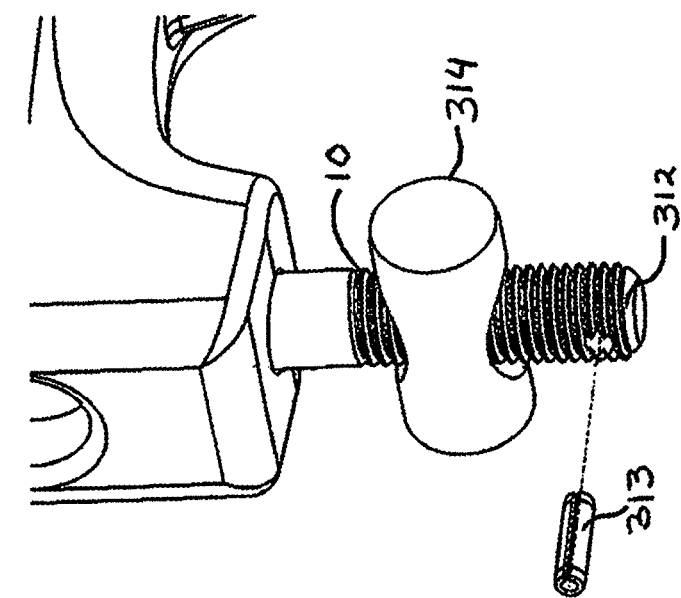
FIG. 27A demonstrates an exploded close-up view of the portion of FIG. 25 in circle 29.

An alternative embodiment with double-barrel double plunger locks is shown in FIGS. 17-18. With double-barrel, the rope can be optionally anchored to the body 1 at anchor point 6 and looped on back end 121 and then run through barrel 5A and looped back into barrel 5B to form a dog bone or a double loop. Alternatively, two separate ropes can be tied down simultaneously, one through each barrel. In this alternative embodiment, it may be preferable to use an embodiment of the finger hole 7 wherein the hole is extended and further includes anchor point 6. Extended finger hole 7 can accommodate multiple fingers, i.e. middle finger and ring finger or ring finger and pinky, etc. whereby the remaining finger(s) can be used to activate handle 3 via handle hole 16. Body 1 includes first and second barrels 5A and 5B traversing through body. Body shaft 8 receives plunger lock 2. The top side can be extended via shield to house the second line and thus shield the hand/palm from the second rope tied there between. Arm 10 includes threaded surface 12 to mate with barrel nut 14 internal threaded surface 22. Barrel nut fits into handle holes 19 within cams 20. Barrel nut 14 is held within holes 19 when mated with arm 10. The advantage of the threaded arm is that as the tie down is in open position, whereby cam short end is facing bottom camming surface 25, handle with imprisoned barrel nut can be rotated and thus lengthen or shorten the distance along arm between plunger hole(s) and pivot point so as to allow for increasing the area of overlap between plunger holes and barrel. In some cases, when the camming action is not drastic enough to occlude the barrel hole with the plunger sides to restrict movement of rope (for instance with a webbing or narrow diameter rope, it is advantageous to partially occlude the barrel(s) with the plunger(s) when open, just enough to allow the rope to travel freely. Given that the cam can only pull plunger so far, one can tighten the plunger so that when closed, plunger is pulled an adequate amount to restrict and lock the line. This functionality allows the tie down to be used effectively with numerous sized and shaped ropes.

Arm 10 may also include lock indentation 40 to hold plunger in place when key lock 39 is turn to force a pin or other shaped boss (not, shown) through body side into plunger lock indentation. Plunger includes a first hole 9A to align with first barrel 5A and second hole 9B to align with second barrel 5B, so that when in closed position 37 plunger sides 35A and 35B can occlude barrels.

Further detail of the tie down locking mechanism is shown in FIGS. 19-22. Rope 23 attaches to tie down body 1 at anchor point 6. When in locked position 37, handle 3 rests along body. Plunger lock arm 10 is in lock position 32, and pulled down so that rope is forced down 33, forcing plunger sides 35 down and into rope, and pinching rope against body housing sides 34, and thus preventing rope to freely pass. Threaded arm 12 mates with barrel nut within handle 3. When opened 38, plunger lock rises and releases rope 23 to slide within barrel. Tie down can use a lock whereby and feature on the external surface of the body can interface with a feature on arm 10 such as key indentation 40.

Similarly, when webbing 24 is used, the tie down functions the same. Handle is rotated to engage threads 12 so that even when open, plunge holes will slightly occlude barrel, but not so much as to impede webbing 24. When closed, plunger lock is in lowered position 32.

Referring now to an embodiment shown in FIGS. 23-32, tie down body 301 includes dual barrels 5A and 5B, whereby rope can extend beyond front face 120. Spacers or air gaps may be included between the two rope lines in the barrel to provide for lighter and cheaper manufacturing. In addition, as is known in the art, uniform thickness allows for better setting of molded nylon materials—to avoid warping, etc. As shown in FIGS. 23 and 24, plunger lock 2 is in down locked position within shaft 8. Plunger holes are defined by edges, including pinching edges 335 in plunger lock holes 9A and 9B. Whereas most of the surface of plunger holes are round, the top may include a flat/straight surface as shown as 335 to further allow trapping of a deformable rope within the barrel. The flat surface on the plunger lock surface 335 better grips materials. For instance, the flat surface provides better alignment with a webbing material presenting a flat edge. Further, the surface features of the plunger lock hole can include various textures and/or teeth to better grip material tied down therein.

Cams 320 are displayed on either side of planar cavity 310. Planar cavity 310 is preferably as wide as, or just wider than the diameter of threaded arm 312. Threads 12 on arm 10 of plunger lock 2 engage barrel nut internal threads 322. A bolt, such as pin 313 may be placed on or through the bottom of arm to engage arm within shaft. In one embodiment, pin is permanently affixed to arm 10, as an external surface nub 312, to ensure that the plunger lock 2 does not disengage from handle 3. Barrel nut 314 may include a cylinder with indented sides 330, preferably top and bottom to best engage threaded surface 12.

Cams 320A and 320B include apertures 305 to hold and bind barrel nut 314, which in turn holds the plunger lock 2 within shaft 8 and handle 3. Cams 320 include cam point 302 that faces upwards towards body 301 in the closed position when the handle is closed.

Body 301 includes a longer finger hole 7 in this embodiment, which doubles as optional anchor 6 if a loop is required. Handle 3 includes finger hole 16 adapted to allow a pointer or middle finger to pull the handle to locked position. Finger extension 303 may be included on handle 3 for additional leverage to provide more torque to force plunger lock into position. In this embodiment, it is considered that a pointer finger would be placed within handle hole 16, a middle finger upon the extension 303, and the ring and pinky fingers within finger hole 7.

When in close position, handle aperture 316 will align with finger hole aperture 307 so that a single bar may pass through both and lock the tie down in closed position (by disabling the handle from opening). With this pin-lock mechanism, the lock at aperture 307 can prevent the opening of the tie down (i.e. rotating out to release pressure from cam on the body bottom), as well as prevent lateral motion of the handle as the tie down might be jarred, for instance, if such tie down was used on a moving vehicle.

As further evidenced in FIG. 28, the misalignment of plunger lock holes 9A and 9B in hollow channels 5A and 5B can interfere and occlude the barrels by pressing surface 335 into the barrels and pinch any rope therein with tie down barrel surfaces 34. Plunger lock 2 may include arm 10 with threads to engage a flat nut, or fixed threaded surface 350 in handle. In one embodiment the shelter tie-down can hold any rope with a diameter of ranging 5/16" to 3/8". When the pin is set in the barrel nut, the tie-down requires no assembly. When properly set on a half-inch cord, the maximum load limit is at least 1280 lbs against horizontal pull.

The present invention describes a novel tie down apparatus for pinching a rope within a hollow channel via single-hand manipulation of an ergonomic tie down handle. While the present description discloses many features of preferred embodiments, one skilled in the art will understand that additional features either demonstrated in the figures or briefly described would be hereby disclosed and enabled.

What is hereby claimed:

1. A tie down mechanism comprising:
   (a) a body for selectively securing a rope to form a loop in said rope;
   (b) said body including a first barrel for accommodating translation of a first length of said rope, and a vertical shaft intersecting said barrel;
   (c) a bolt for securing the first length of rope within said barrel, said bolt arranged within said vertical shaft, said bolt comprising at least a first aperture wherein said first length of rope is run there through;
   (d) a handle pivotally attached to said body and coupled to said bolt, whereby rotation of said handle translates said bolt within said vertical shaft to selectively secure the first length of rope to the tie down mechanism;
   wherein said bolt translates vertically to selectively align, and misalign, said at least a first aperture with said barrel to unlock, and lock, said rope within said tie down mechanism.

2. The tie down mechanism as set forth in claim 1 further comprising a pin coupled with said handle, and wherein said bolt comprises a lower aperture adapted to receive said pin.

3. The tie down mechanism as set forth in claim 1 further comprising a nut coupled to said handle and said bolt; said bolt comprising a lower surface, said lower surface comprising a threaded surface; wherein said nut threadedly engaging said bolt lower surface.

4. The tie down mechanism as set forth in claim 3 wherein said bolt further comprises a lower aperture adapted to receive a pin below at least a portion of said threaded surface.

5. The tie down mechanism as set forth in claim 3 wherein said nut providing an axis of rotation to pivot said handle.

6. The tie down mechanism as set forth in claim 1 wherein said body further comprises an anchor point, said anchor point comprising an aperture along said body.

7. The tie down mechanism as set forth in claim 1 wherein said body comprises a second barrel parallel said first barrel, said second barrel for accommodating translation of a second length of rope; and wherein said bolt comprises a second aperture providing a path for said second length of rope is run there through.

8. The tie down mechanism as set forth in claim 1 wherein said handle comprises twin cam lobes, said handle adapted to pull said bolt down through said vertical shaft and thereby occluding said barrel with said bolt.

9. The tie down mechanism as set forth in claim 8 further comprising a pin passing through a lower aperture along a lower end of said bolt, said pin providing an axis of rotation to pivot said handle.

10. The tie down mechanism as set forth in claim 8 further comprising a nut threadedly engaged around said bolt, said nut providing an axis of rotation to pivot said handle.

11. A tie down mechanism for securing a length of rope, tape or webbing, said tie down mechanism comprising:
    (a) a body comprising a hollow channel for passage of a rope, tape or webbing;
    (b) a vertical shaft aligned perpendicular to said hollow channel and intersecting said hollow channel;
    (c) said vertical shaft adapted to allow a bolt to translate through said vertical shaft, said bolt comprising an arm wherein said arm comprises a main aperture adapted to allow passage of said rope through said main aperture when said main aperture is aligned with said hollow channel;
    (d) said bolt further comprising a lower arm adapted to couple with a rotating handle via a cam;
    (e) whereby said cam being rotatable from a short position placing said main aperture in at least partial alignment with said hollow channel, to a long position whereby said cam interfaces with a surface of said body so as to force said bolt to translate in said vertical shaft whereby said main aperture shifts to allow said bolt to occlude at least a portion of said hollow channel.

12. The tie-down mechanism of claim 11 wherein said main aperture comprises a flat edge.

13. The tie-down mechanism of claim 11 wherein said body further comprises an attachment cavity for fixing a fixed end of said rope or webbing to said body.

14. The tie-down mechanism of claim 11 wherein said main aperture comprises a circular aperture.

15. The tie-down mechanism of claim 11 wherein said main aperture comprises a rectangular aperture.

16. The tie-down mechanism of claim 11 wherein said cam comprises a double-lobed cam, said tie down mechanism further comprising a barrel nut adapted to reside between lobe cams of said double-lobed cam, and wherein said bolt comprises a threaded surface to mate with an interior surface of said barrel nut.

17. The tie-down mechanism of claim 16, whereby the rising of a location of the barrel nut along the surface of said bolt tightens the tie down mechanism when said cam is rotated to said long position to force further occlusion of said hollow channel.

18. The tie-down mechanism of claim 11 wherein said bolt comprises a cavity along a lower end of said bolt, said cavity adapted to receive a pin through said cam to secure said bolt onto said handle.

19. The tie down mechanism of claim 11 further comprising a second hollow channel for a second length of rope or webbing; and said bolt further comprising a secondary aperture adapted to at least partially align with said second hollow channel.

20. The tie-down mechanism of claim 11 wherein said cam comprises a set of two parallel cams, said two parallel cams separated from one another by at least a width of the bolt there between.

21. The tie-down mechanism of claim 11 further comprising a lock mechanism in the side of the body adapted to apply a pin into a lower portion of said bolt.

\* \* \* \* \*